US012677837B2

(12) United States Patent
Cecchin et al.

(10) Patent No.: US 12,677,837 B2
(45) Date of Patent: Jul. 14, 2026

(54) DEVICE AND PROCESS FOR FORMING STUFFED PASTA PRODUCTS STARTING FROM A SHEET OF DOUGH

(71) Applicant: PAVAN S.p.A., Galliera Veneta (IT)

(72) Inventors: Alessandro Cecchin, Treviso (IT); Giulio Chiminelli, Treviso (IT)

(73) Assignee: PAVAN S.P.A., Galliera Veneta (IT)

( * ) Notice: Subject to any disclaimer, the term of this patent is extended or adjusted under 35 U.S.C. 154(b) by 25 days.

(21) Appl. No.: 18/040,773

(22) PCT Filed: Jun. 16, 2022

(86) PCT No.: PCT/IB2022/055605
§ 371 (c)(1),
(2) Date: Feb. 6, 2023

(87) PCT Pub. No.: WO2022/269425
PCT Pub. Date: Dec. 29, 2022

(65) Prior Publication Data
US 2024/0108013 A1 Apr. 4, 2024

(30) Foreign Application Priority Data
Jun. 22, 2021 (IT) ........................ 102021000016367

(51) Int. Cl.
*A21C 9/06* (2006.01)
*A23L 7/109* (2016.01)

(52) U.S. Cl.
CPC .............. *A21C 9/063* (2013.01); *A21C 9/066* (2013.01); *A23L 7/11* (2016.08)

(58) Field of Classification Search
None
See application file for complete search history.

(56) References Cited

U.S. PATENT DOCUMENTS 3,605,641 A * 9/1971 Shuster .................... A21C 1/06
425/513
4,160,634 A * 7/1979 Huang ................... A21C 9/063
99/450.6
(Continued)

FOREIGN PATENT DOCUMENTS

BR 202021006698 U2 * 10/2022
IT MI20082047 A1 5/2010
(Continued)

OTHER PUBLICATIONS

International Search Report and Written Opinion issued in connection with International Patent Application No. PCT/IB2022/055605, dated Dec. 6, 2022.

*Primary Examiner* — Thor S Campbell
(74) *Attorney, Agent, or Firm* — Chrisman Gallo Tochtrop LLC

(57) ABSTRACT

A device for forming stuffed pasta products starting from a sheet of dough. The device includes dispensing means for dispensing a stuffing comprising at least one support for the stuffing and a forming station in which means for deforming the sheet of dough is arranged so as to create in the sheet of dough a housing site for housing a dose of stuffing coming from said support. The support may be movable along a predefined direction towards the product forming station.

14 Claims, 18 Drawing Sheets

(56)                    References Cited

U.S. PATENT DOCUMENTS

| | | | | |
|---|---|---|---|---|
| 4,848,218 | A | * | 7/1989 | Battaglia ................ A21C 9/066 |
| | | | | 99/450.2 |
| 5,205,209 | A | * | 4/1993 | Tansini ................. A21C 9/063 |
| | | | | 99/450.6 |
| 5,588,356 | A | * | 12/1996 | Rizzi .................... A23G 3/2061 |
| | | | | 425/383 |
| 5,590,589 | A | * | 1/1997 | Battaglia ................ A21C 11/06 |
| | | | | 99/450.2 |
| 6,355,288 | B1 | * | 3/2002 | DiGiacomo ........... A21C 9/063 |
| | | | | 426/282 |
| 2015/0125564 | A1 | * | 5/2015 | Chen ..................... A21C 9/063 |
| | | | | 425/297 |
| 2020/0100528 | A1 | * | 4/2020 | Rana ...................... A23L 7/111 |

FOREIGN PATENT DOCUMENTS

| | | | | |
|---|---|---|---|---|
| IT | MI20090429 | A1 | 9/2010 | |
| IT | MI20100156 | A1 * | 8/2011 | ............. A21C 9/066 |
| IT | MI20120308 | A1 | 8/2013 | |

* cited by examiner (a)          (b)          (c)

DEVICE AND PROCESS FOR FORMING STUFFED PASTA PRODUCTS STARTING FROM A SHEET OF DOUGH

TECHNICAL FIELD

The present invention relates to a device and a process for forming stuffed pasta products starting from a sheet of dough and a relative forming apparatus.

The technical sector of reference is that of the production of stuffed pasta or bakery and confectionery products.

BACKGROUND

There are different formats of stuffed pasta, such as ravioli, cappelletti, tortellini, saccottini, fagottini, etc.

Stuffed pasta products can made with double sheet (or double layer) or single sheet (or single layer).

A double sheet product comprises a first layer and a second layer of sheet of dough, between which a stuffing is enclosed.

The two layers of sheet are superimposed on each other and pressed at a welding edge defining a closed path around a stuffing housing area. This prevents the stuffing from escaping from the product.

Each layer of sheet of the stuffed product has a protrusion caused by the stuffing, which in the sector is indicated by the term "belly" or "pocket".

A single sheet product comprises a single layer of sheet of dough, folded on itself in such a way as to accommodate the stuffing in its inside. In this case, two flaps of the folded layer of sheet are approached, superimposed on each other and pressed at a welding edge that prevents the stuffing from escaping.

In a known solution, the stuffing of the sheet of dough takes place through the device schematically illustrated in FIG. 1 for a single-layer application. In such a device, a dose of stuffing (indicated by the number 102) is pushed along a conduit by the action of a piston or plunger, indicated by the number 9.

The piston-conduit block is arranged in front of the product forming area, at a fixed distance from the punch, indicated by the number 8, which incises the dough 101. The punch 8 is interposed between the piston-conduit block and two forming rollers 5a, 5b.

The stuffing thus dispensed risks moving or slipping wholly or partially before reaching the punch 8 and the area between the rollers 5a, 5b. This is due to the flight time of the stuffing, which occurs between the dispensing from the piston-conduit block and the arrival in the punch 8.

The slippage of the stuffing can give rise to a decentralized or insufficient distribution of the stuffing, which makes the product non-compliant with quality standards, which is therefore discarded. In addition, the stuffing can fall on the underlying parts of the machine, dirtying them. This implies the need to provide for periodic cleaning interventions and, in some cases, affects the functionality of the machine.

If the dispensed stuffing is very soft or semi-liquid (e.g. with relative humidity above 55%), the problem is even more pronounced.

FIGS. 2-3 illustrate two other solutions of known type, for double-layer applications. These solutions are also affected by the same problems, linked to the flight time of the stuffing.

SUMMARY

A device for forming stuffed pasta products starting from a sheet of dough. The device includes dispensing means for dispensing a stuffing comprising at least one support for the stuffing and a forming station in which means for deforming the sheet of dough is arranged so as to create in the sheet of dough a housing site for housing a dose of stuffing coming from said support. The support may be movable along a predefined direction towards the forming station.

BRIEF DESCRIPTION OF DRAWINGS

Further characteristics and advantages of the present invention will more fully emerge from the approximate and thus non-limiting description of a preferred but not exclusive embodiment of a device and process for forming stuffed pasta products starting from a sheet of dough, as illustrated in the accompanying drawings in which:

FIGS. 10(a), 10(b), 10(c) illustrate as many variations of the plate-like element of the device of FIG. 9, in cross section;

Figure 16:
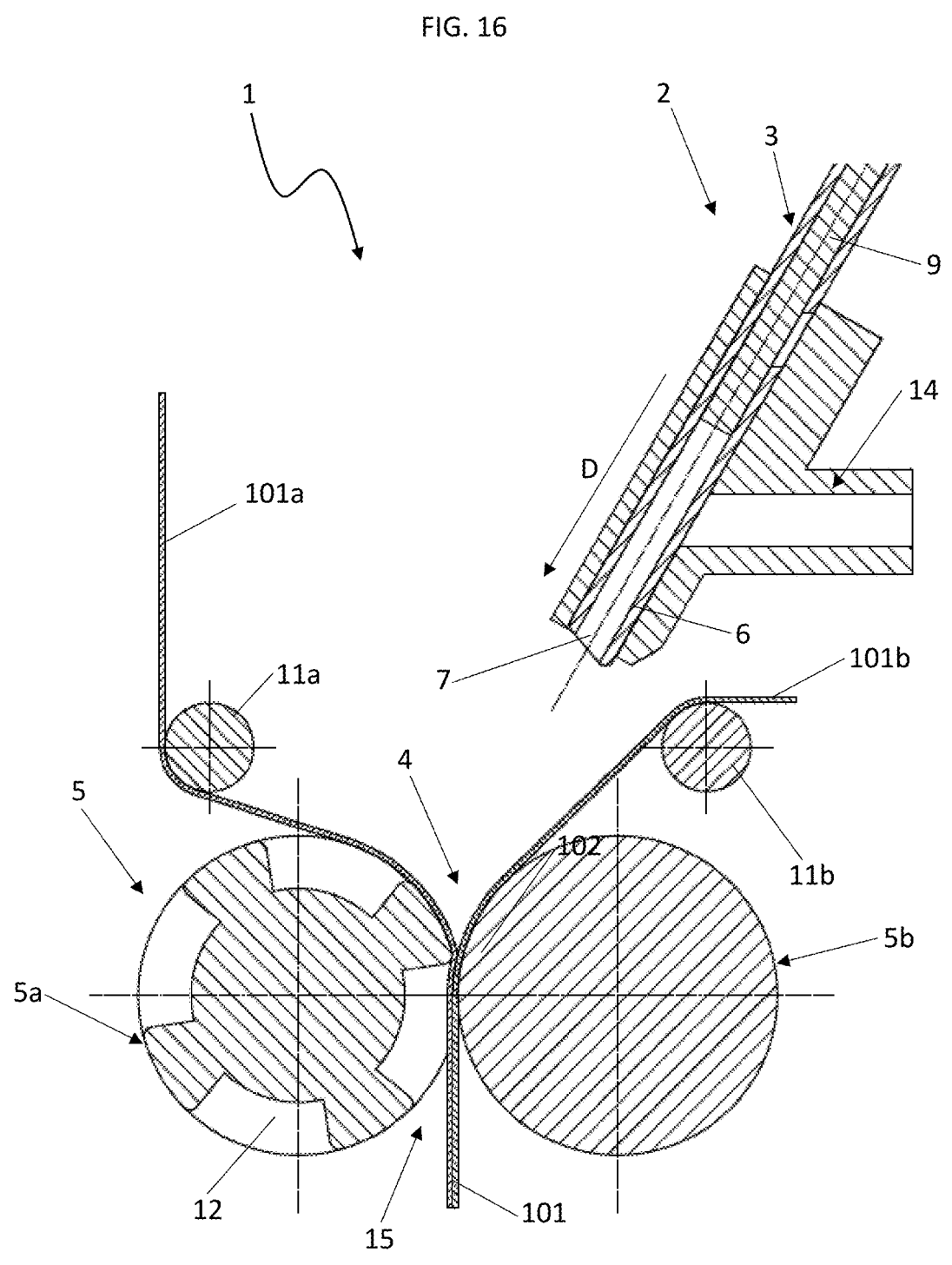

FIGS. 16 to 20 are sectional side views of a variant of the device of FIGS. 11-15, in accordance with the present invention;

DETAILED DESCRIPTION

Figure 1:
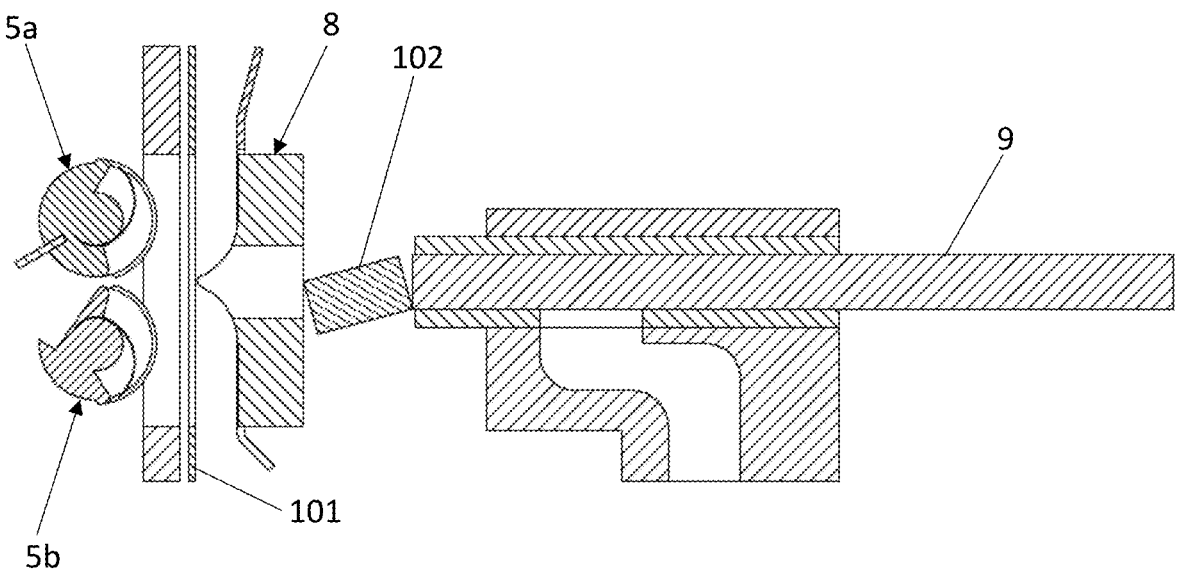
FIGS. 1, 2 and 3 are sectional side views of devices known for forming stuffed pasta products.
Figure 2:
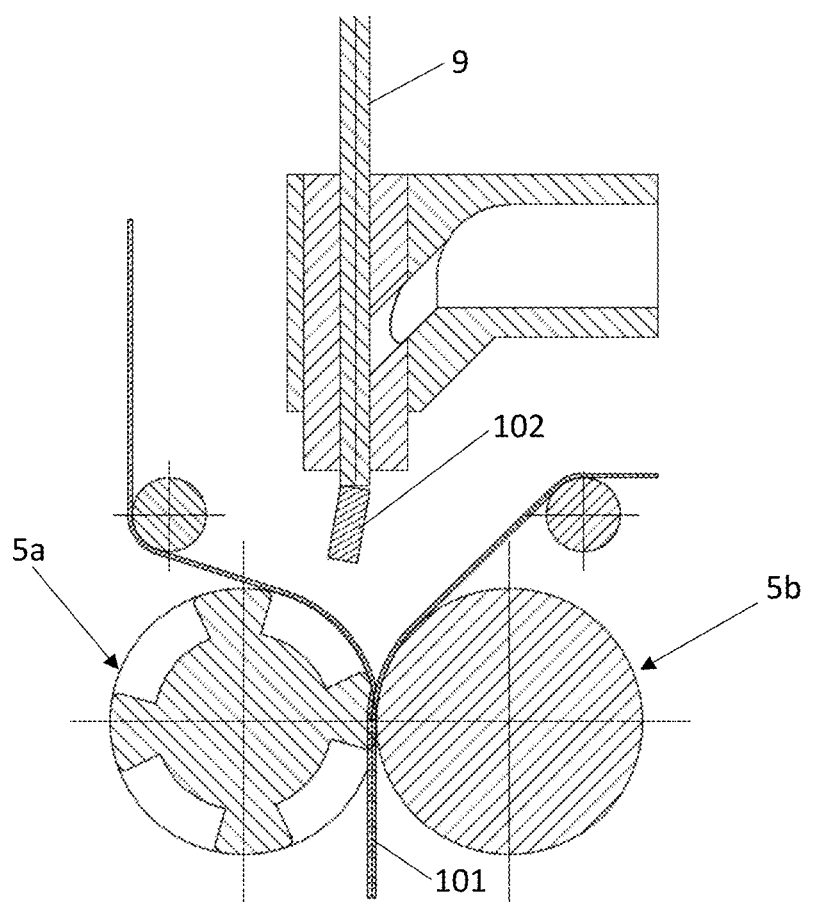
Figure 3:
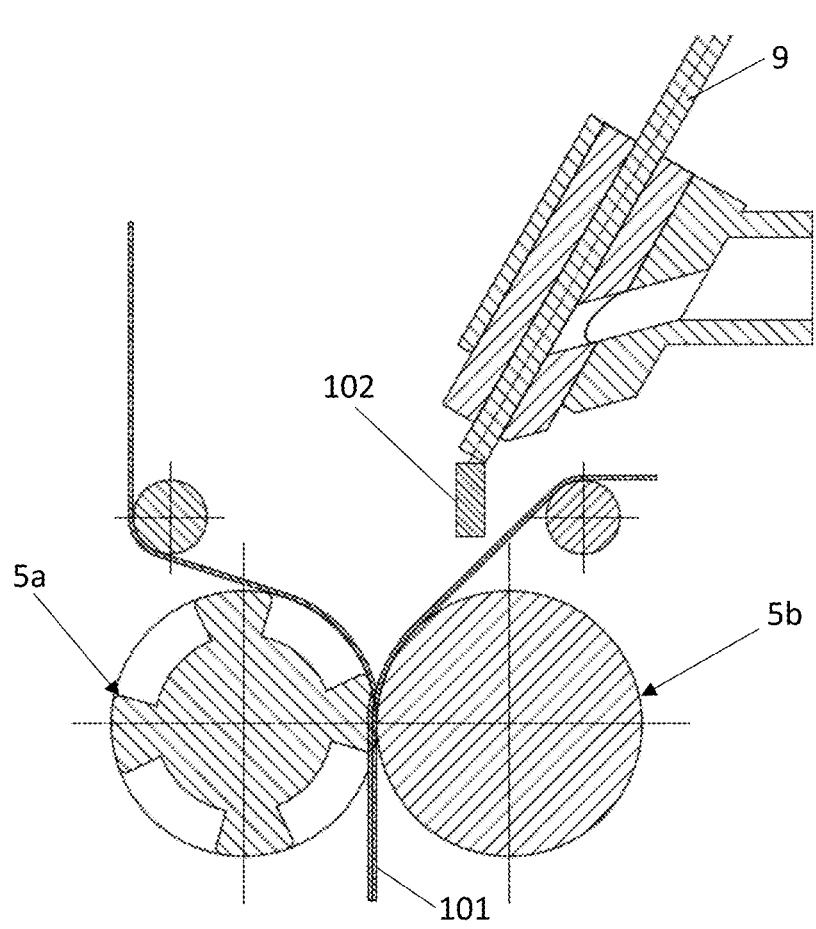
Figure 4:
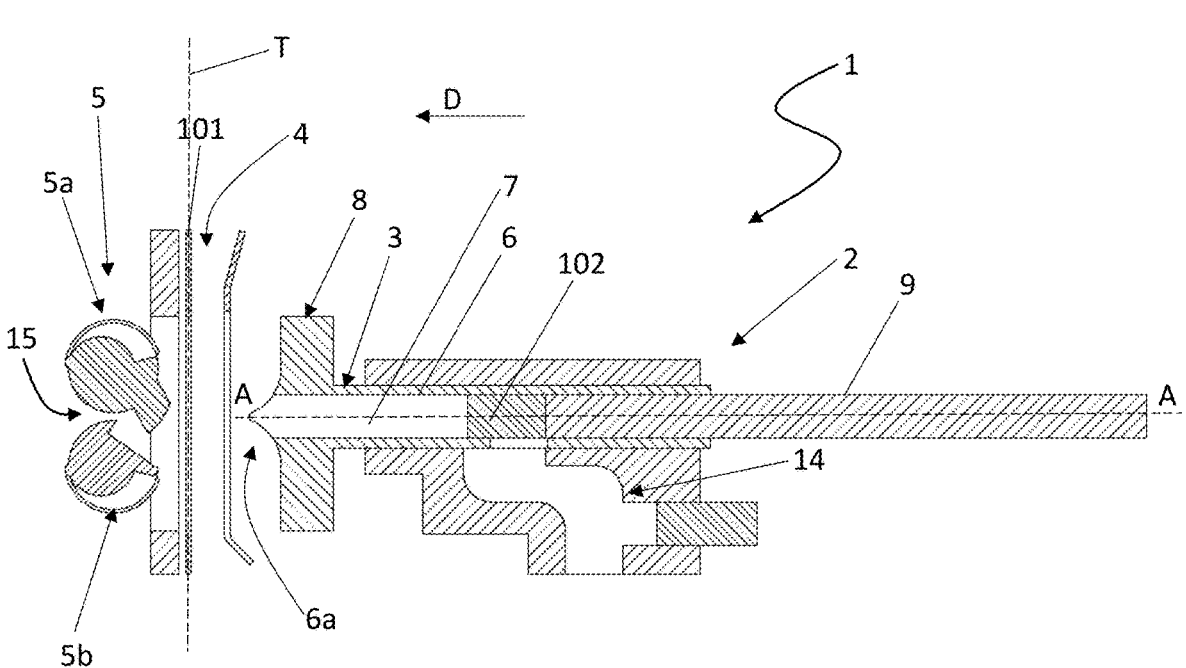
FIGS. 4 to 8 are sectional side views of a first embodiment of a device for forming stuffed pasta products starting from a "single-layer" sheet of dough, in different positions, in accordance with the present invention.

In this context, the technical task underpinning the present invention is to propose a device and a process for forming stuffed pasta products starting from a sheet of dough, which obviate the drawbacks of the above-cited prior art.

In particular, the object of the present invention is to provide a device and a process for forming stuffed pasta products starting from a sheet of dough, which counteract the displacement or the fall of the dose of stuffing during the step of stuffing and forming of the sheet.

Another object of the present invention is to propose a device and a process for forming stuffed pasta products starting from a sheet of dough, which guarantee a reliable forming of the products with stuffings of all textures, even the very soft ones.

Another object of the present invention is to propose a device and a process for forming stuffed pasta products starting from a sheet of dough, which improves the quality of industrial production of the stuffed pasta.

The stated technical task and specified objects are substantially achieved by a device for forming stuffed pasta products starting from a sheet of dough, comprising:

dispensing means for dispensing a stuffing comprising at least one support for the stuffing;

a forming station in which means for deforming the sheet of dough is arranged so as to create in the sheet of dough a housing site for housing a dose of stuffing coming from said support, wherein the support is movable along a predefined direction towards the product forming station.

In accordance with an embodiment, the support consists of a tubular element extending along a prevalent direction parallel to the predefined direction and delimiting a first passage channel of the stuffing.

In particular, the tubular element has an open end for dispensing the dose of stuffing and is telescopic along the prevalent direction so as to move the open end towards the product forming station.

The device further comprises a punching member configured to incise the sheet of dough.

In particular, the punching member is placed upstream of the means for deforming the sheet of dough.

In accordance with an aspect of the invention, the punching member is obtained by the shaping of the open end of the tubular element.

In accordance with an aspect of the invention, the punching member is integrally fixed to the tubular element at an open end thereof.

In accordance with an aspect of the invention, the punching member is interposed between the means for deforming the sheet of dough and the tubular element.

In accordance with an aspect of the invention, the tubular element is partially extensible inside the punching member.

In accordance with an aspect of the invention, the punching member is movable towards the product forming station independently with respect to the telescopic movement of the tubular element.

In accordance with an embodiment, the means for deforming the sheet of dough comprises a pair of parallel rotating rollers placed one above the other and defining a gap for the passage of the sheet of dough.

In accordance with an embodiment, the means for deforming the sheet of dough comprises a pair of parallel rotating rollers placed alongside one another and defining a gap for the passage of a first layer and a second layer of the sheet of dough.

In accordance with an aspect of the invention, the tubular element is orthogonal or inclined with respect to corresponding axes of rotation of the rollers.

In accordance with an embodiment, the support consists of a plate-like element.

For example, the plate-like element has a planar extension or planar with side edges or has a concave shape.

The stated technical task and specified objects are substantially achieved by a process for forming stuffed pasta products starting from a sheet of dough, comprising the steps of:

arranging a dose of stuffing on a support;
    advancing the sheet of dough;
    at a forming station, deforming the sheet of dough so as to create a housing site for housing the dose of stuffing;
    moving the support towards the product forming station;
    transferring the dose of stuffing from the support to the housing site obtained in the sheet of dough.

In accordance with an embodiment, the process further comprises a step of incising the sheet of dough in the forming station.

In accordance with an aspect of the invention, the sheet of dough comprises a single layer which is moved downwards along an advancement trajectory. In such a case, the support is moved towards the forming station along a predefined direction that is inclined with respect to the advancement trajectory of the sheet of dough.

Preferably, the predetermined direction is substantially orthogonal to the advancement trajectory of the sheet of dough.

In accordance with an embodiment, the process further comprises a step of incising the sheet of dough downstream of the forming station.

In accordance with an aspect of the invention, the sheet of dough comprises two layers which are supplied individually to the forming station.

With reference to the figures, the number 1 indicates a device for forming stuffed pasta products starting from a sheet of dough 101.

The sheet of dough 101 may comprise one or more sheet layers.

The product can be a raviolo, a cappelletto, a tortellino, a saccottino, a fagottino, etc.

The device 1 comprises dispensing means 2 for dispensing a stuffing, which comprises at least one support 3 for the stuffing.

A dose of stuffing has been indicated with the number 102. In this context, the dose of stuffing is also called the "tablet".

For example, the stuffing is based on meat, fish, vegetables, cheese or a combination of these ingredients.

Alternatively, the stuffing can be sweet, for example based on chocolate, jam, cream, etc.

The device 1 further comprises a forming station 4 in which means for deforming 5 the sheet of dough 101 advancing along an advancement trajectory T is arranged so as to create in the sheet of dough 101 a housing site for housing a dose of stuffing 102 coming from said support 3.

The means for deforming 5 the sheet of dough 101 are shaped in such a way as to define a gap 15 for the passage of the sheet of dough 101.

The structure of the deforming means 5 depends on the type of stuffed pasta that it is wished to obtain, so it is possible to choose among rollers, rods, bars, orifices with variable diameters to let the stuffing pass, etc.

In the embodiments described and illustrated herein, which are not limiting, the deforming means 5 comprises a pair of rotating rollers 5a, 5b.

These rollers are commonly referred to in the sector as "forming rollers" to distinguish them from the "shearing rollers" that are placed downstream in the applications with double-layer sheet.

Originally, the support 3 is movable along a predefined direction D towards the forming station 4.

In accordance with a first embodiment, the support 3 for the stuffing consists of a tubular element 6 extending along a prevalent direction A-A and delimiting a first passage channel 7 for the doses of stuffing 102.

The prevalent direction A-A coincides with or is parallel to the predefined direction D.

The tubular element 6 has an open end 6a for dispensing the doses of stuffing 102 near the forming station 4.

The tubular element 6 is telescopic along the predefined direction A-A so as to move the open end 6a towards the forming station 4 of the products.

Preferably, the dispensing means 2 comprise a stuffing supply circuit 14.

The first passage channel 7 is part of the stuffing supply circuit 14.

Figure 9:
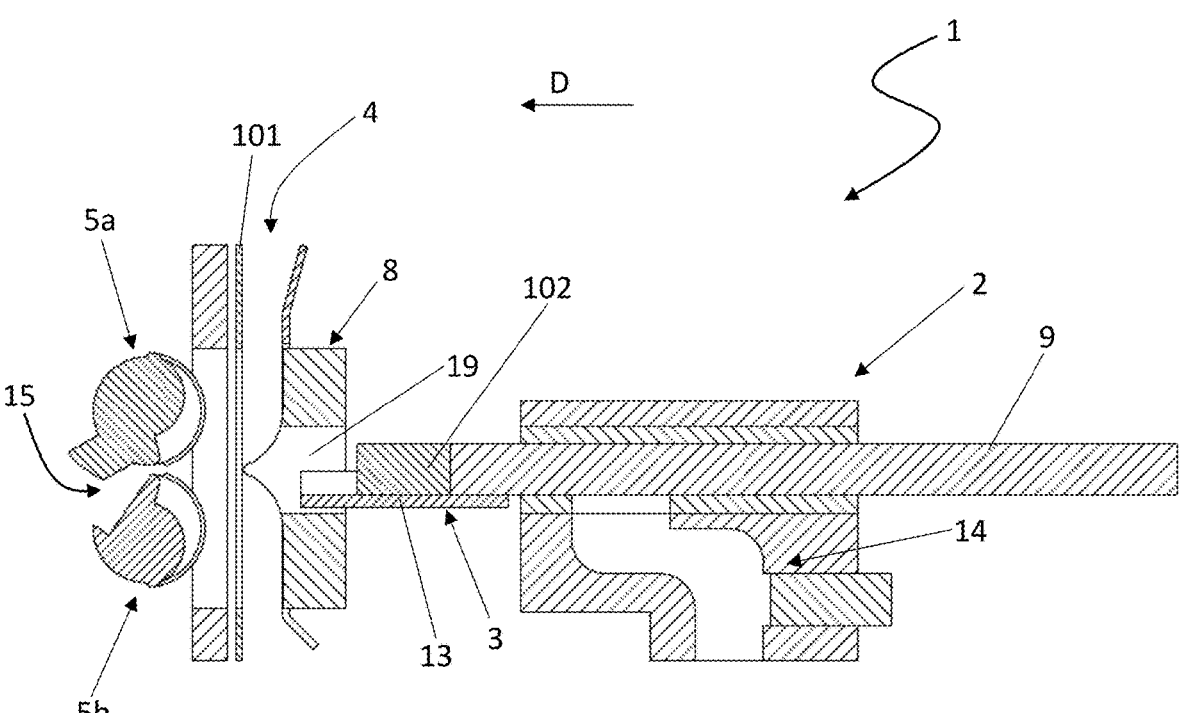
FIG. 9 is a sectional side view of a second embodiment of a device for forming stuffed pasta products starting from a "single-layer" sheet of dough, in accordance with the present invention.

In accordance with a second embodiment, illustrated in FIG. 9, the support 3 for the stuffing consists of a plate-like element 13.

Figures 10, 11:
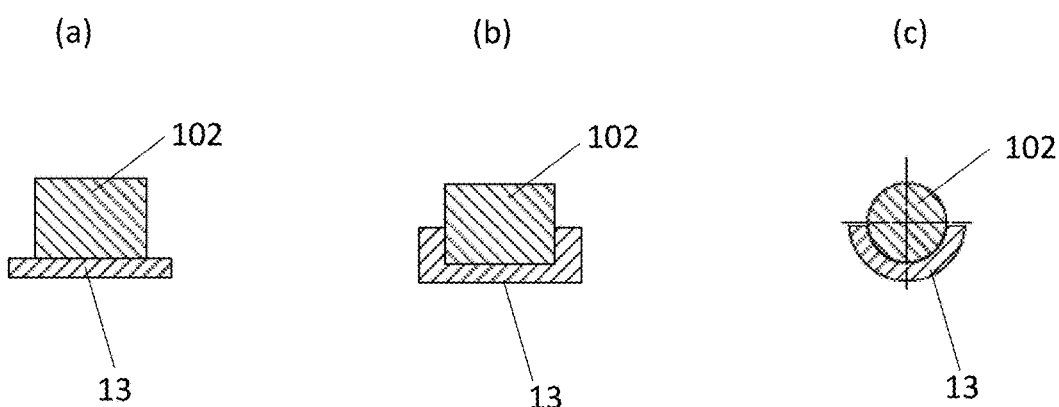
FIGS. 11 to 15 are sectional side views of a first embodiment of a device for forming stuffed pasta products starting from a "double-layer" sheet of dough, in different positions, in accordance with the present invention.
Figure 12:
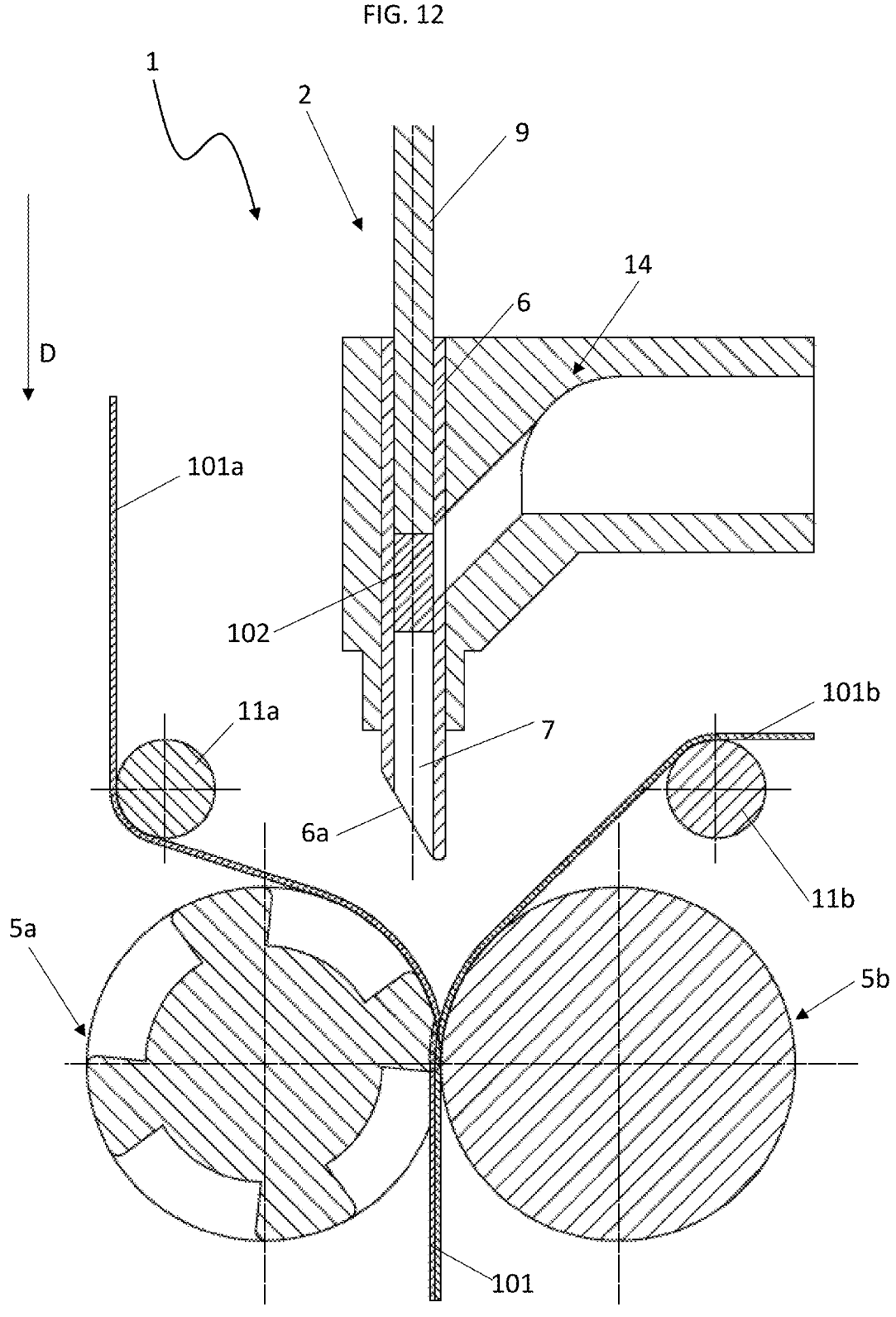
Figure 13:
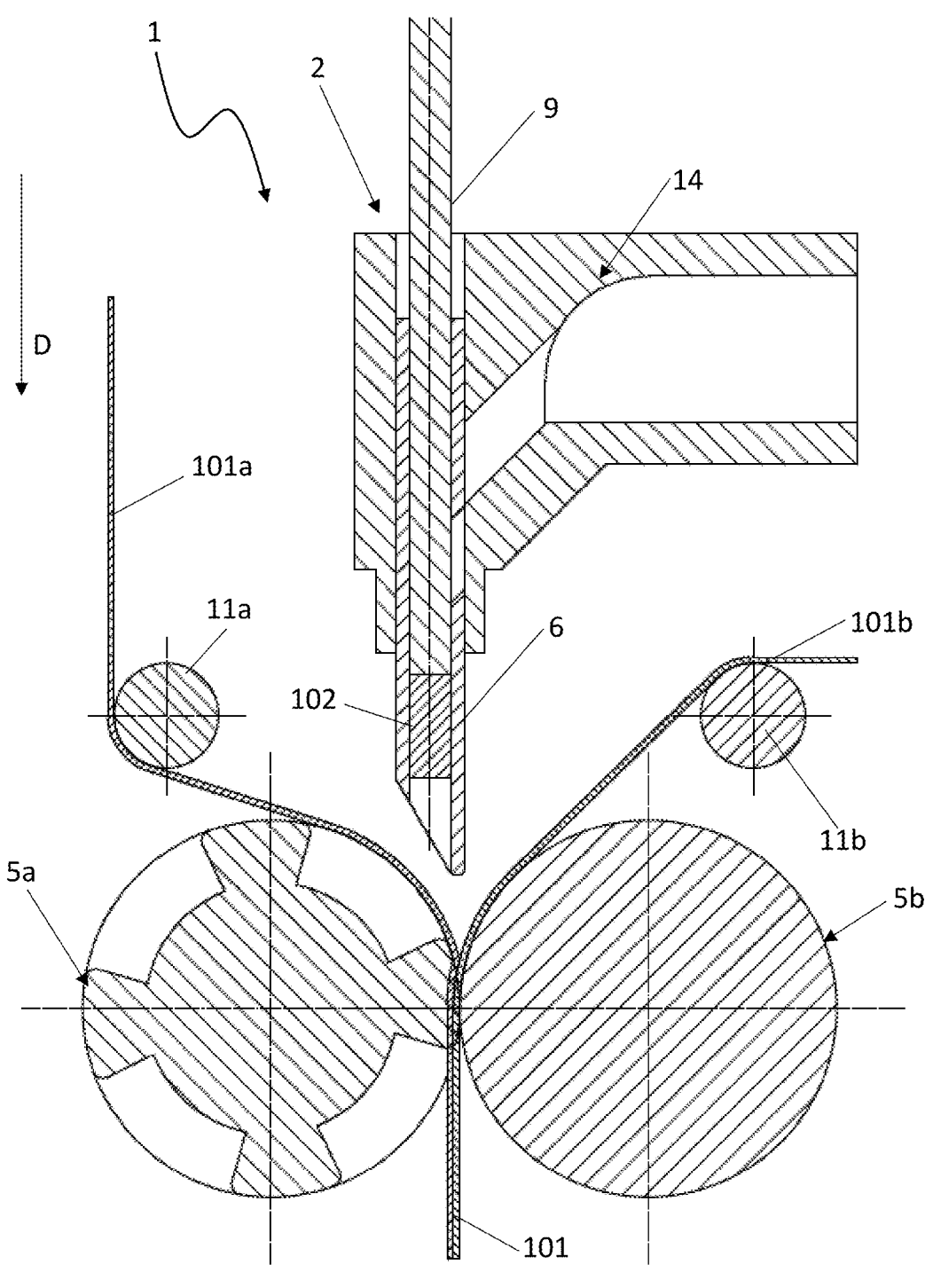
Figure 14:
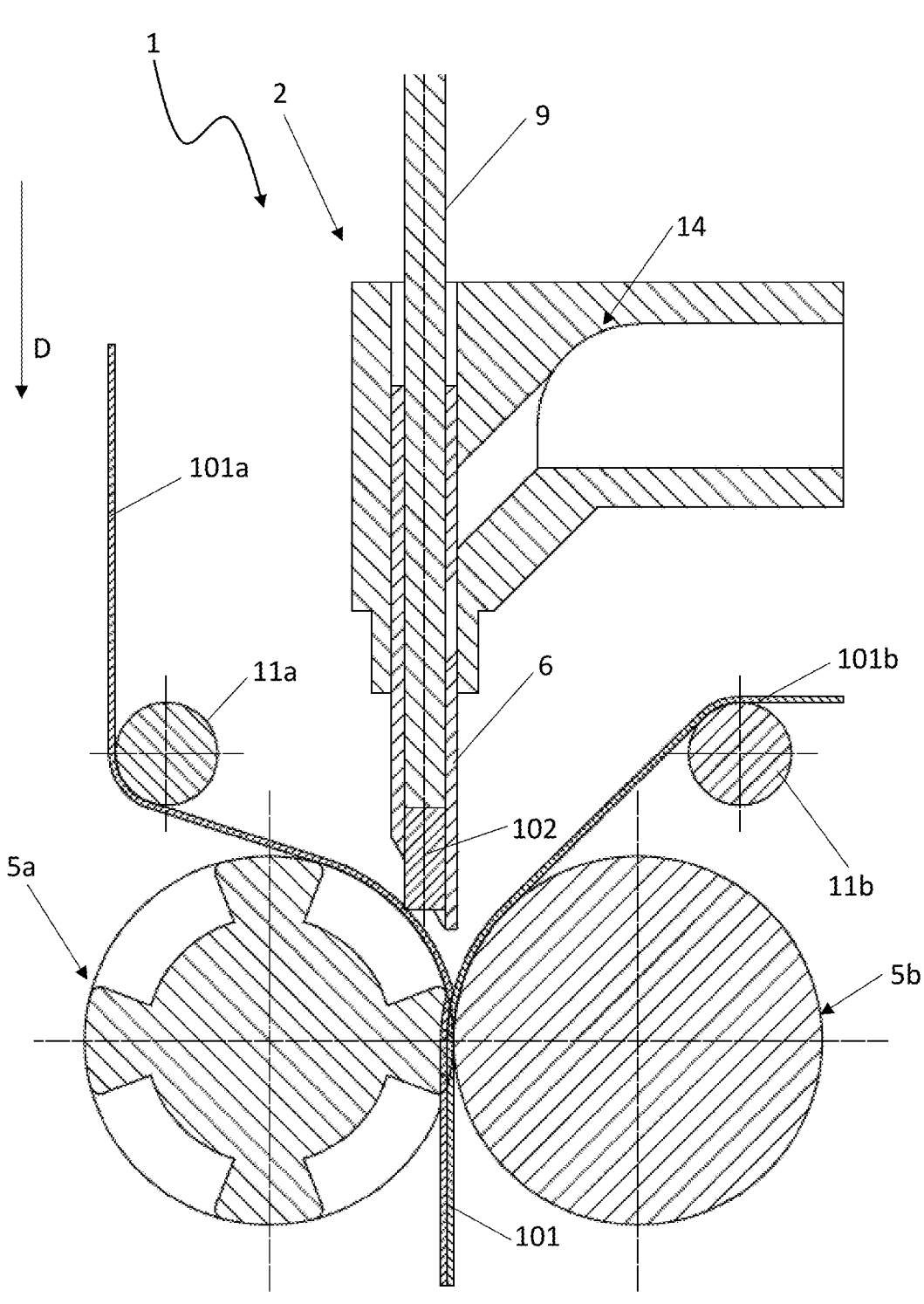
Figure 15:
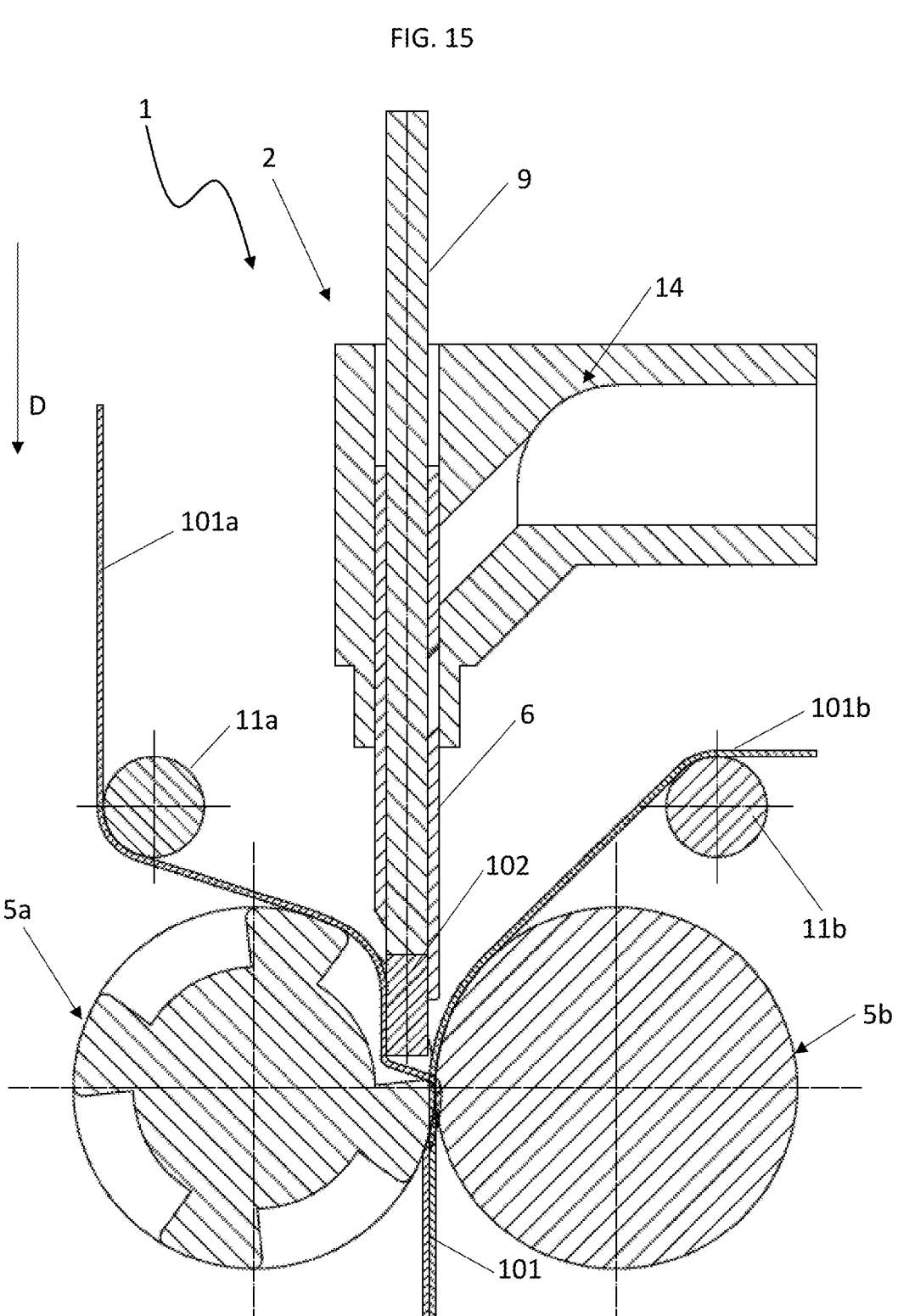
Figure 17:
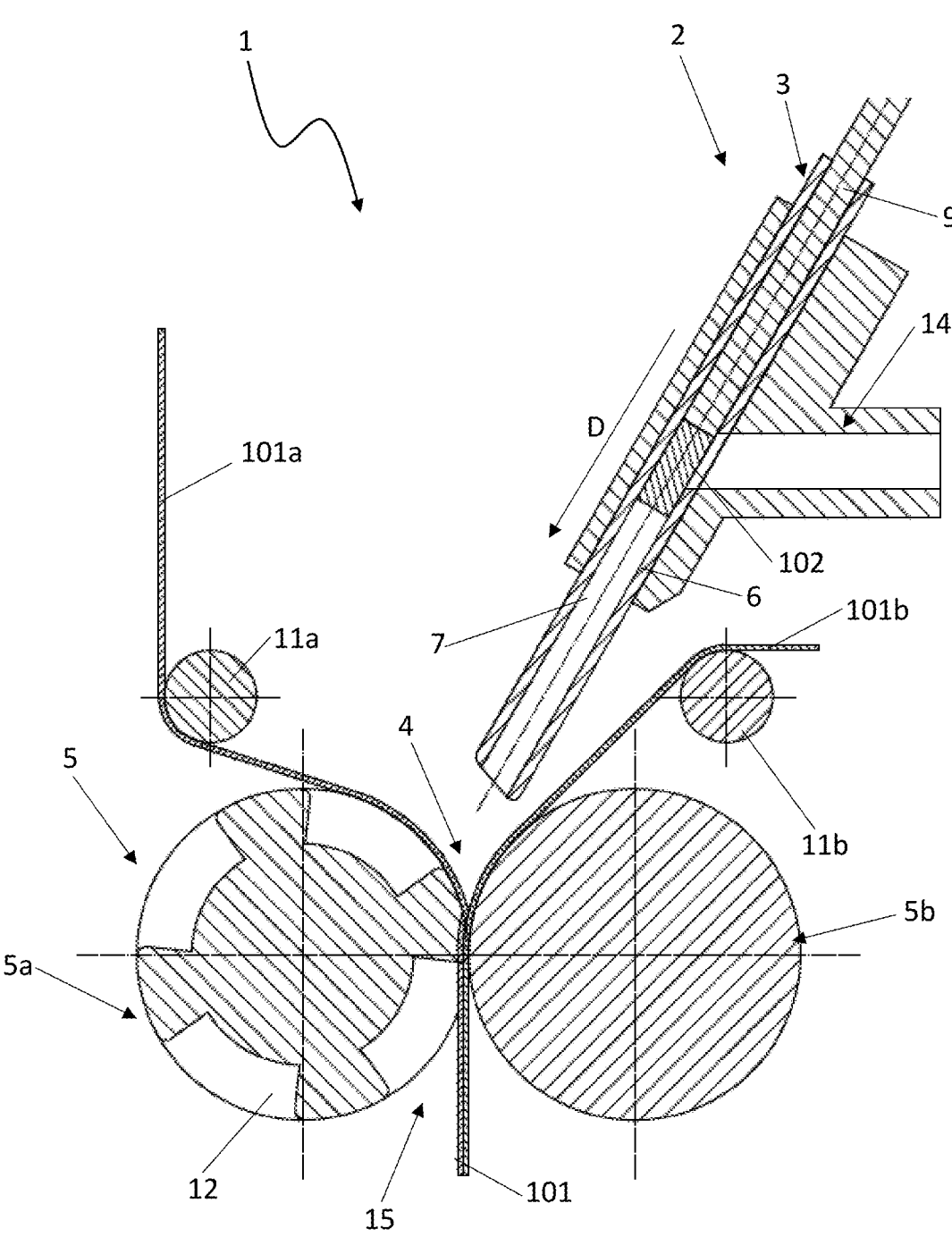
Figure 18:
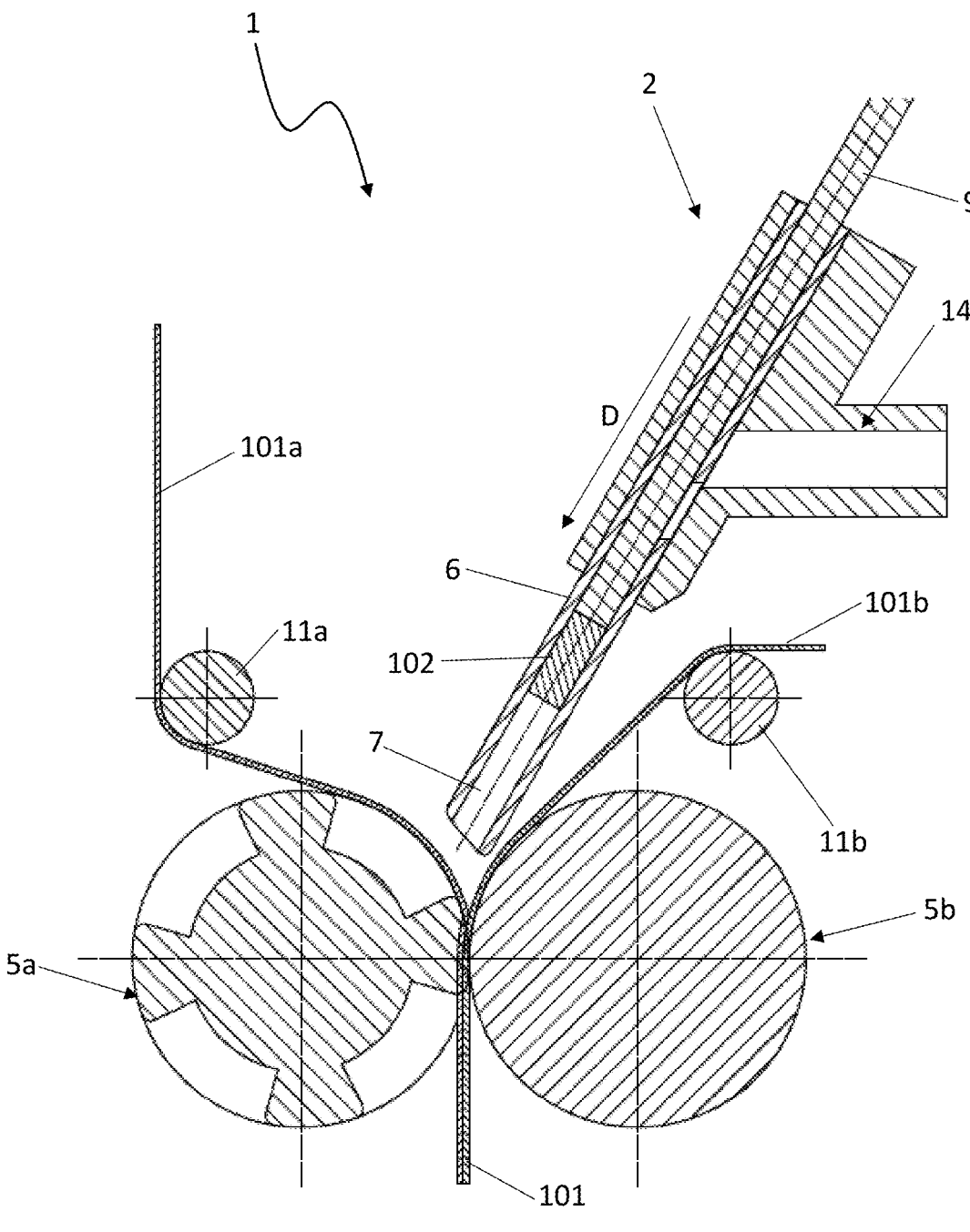
Figure 19:
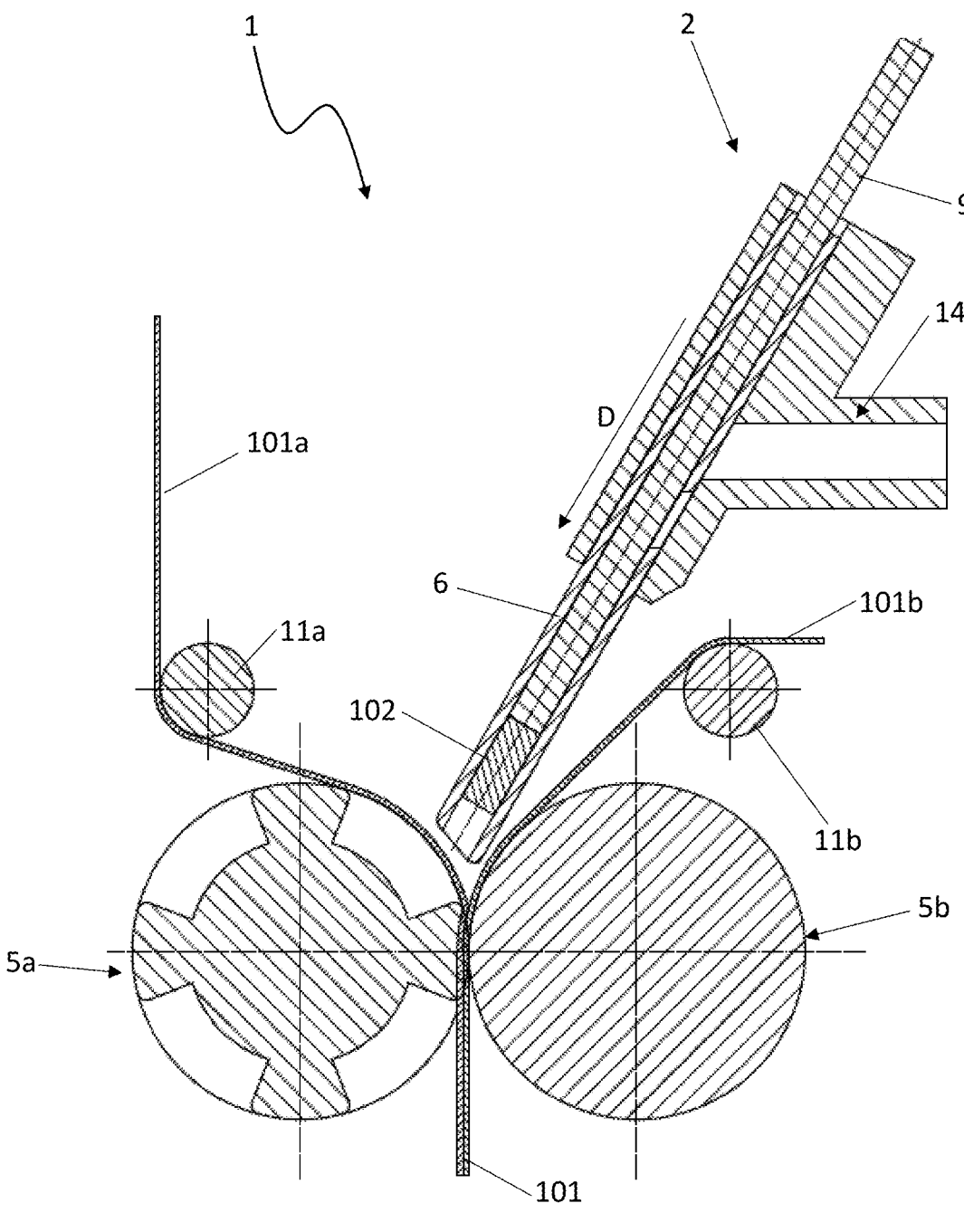

For example, the plate-like element 13 has a planar extension, as illustrated in FIG. 9 or FIG. 10(*a*). In an alternative, the plate-like element 13 has a planar shape with sidewalls (see FIG. 10(*b*)) so as to limit the displacement or loss of the stuffing.

In a further alternative, the plate-like element 13 has a concave shape (see FIG. 10(*c*)), so as again to limit the displacement or loss of the stuffing.

The various types of plate-like element 13 are of the "open" type, unlike the tubular element 6, which defines a closed channel (open only at the dispensing end).

As mentioned, the sheet of dough 101 may comprise a single layer or multiple layers. In the following, reference will be made to two types of sheet of dough 101, namely:

a sheet of dough formed by only one layer, for simplicity's sake referred to as a "single layer";

a sheet of dough formed by two layers, for simplicity's sake referred to as a "double layer".

In the application with "single-layer" sheet, the device 1 further comprises a punching member 8 configured to incise the sheet of dough 101.

The punching member 8 is placed upstream of the means for deforming 5 the sheet of dough 101.

Preferably, the sheet of dough 101 is supplied from above, by gravity.

In the case of the first embodiment, in which the support 3 for the stuffing consists of the tubular element 6, different variants can be envisaged.

In the variant illustrated in FIGS. 4 to 8, the punching member 8 is obtained by the shaping of the open end 6*a* of the tubular element 6. In other words, the punching member 8 and the tubular element 6 are made as one piece only.

In particular, the first passage channel 7 also extends through the punching member 8. The open end 6*a* of the tubular element 6 represents a dispensing nozzle of the dose of stuffing 102.

The tubular element 6 can extend telescopically starting from a first limit position corresponding to the maximum distance from the deforming means 5, to a second limit position corresponding to the minimum distance from the deforming means 5.

Figure 23:
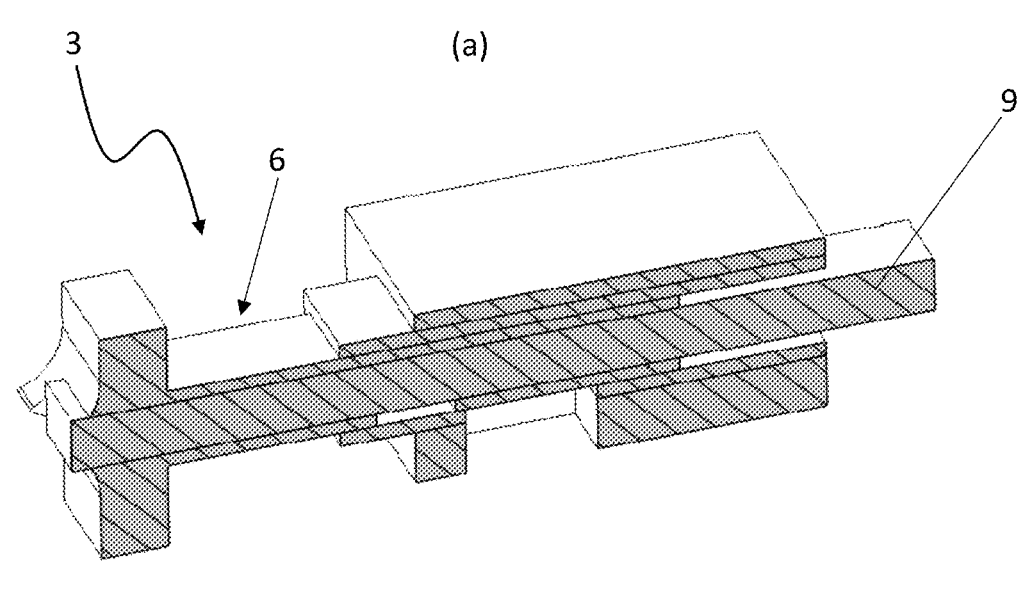
FIGS. 23(a) and 23(b) illustrate the tubular element used in the first embodiment, respectively in an extracted position and in a retracted position.
Figure 23:
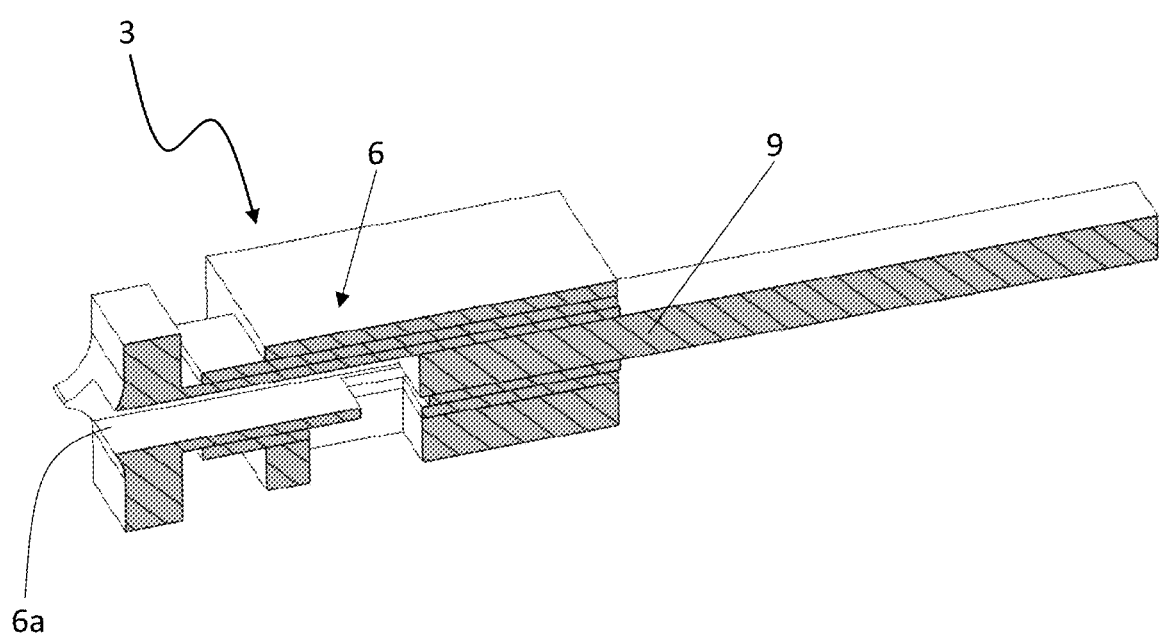

The telescopic tubular element 6 is composed by a plurality of portions that may be made to slide one with respect to the other, so as to pass from an extracted configuration to a retracted configuration, that are visible for example in FIGS. 23(*a*) and 23(*b*).

In another variant, not illustrated, the punching member 8 is integrally fixed to the tubular element 6 at the open end 6*a* thereof.

Also in this variant, the tubular element 6 can extend telescopically so that the punching member 8 integral with it passes from a first limit position corresponding to the maximum distance from the deforming means 5, to a second limit position corresponding to the minimum distance from the deforming means 5.

In particular, the punching member 8 is crossed by a second stuffing passage channel which is aligned with the first passage channel 7 so that the stuffing passes from the first passage channel 7 to the second passage channel seamlessly.

In another variant, not illustrated, the punching member 8 is separated from the dispensing means 2.

Also in this variant, the punching member 8 is crossed by a second passage channel sized in such a way that the tubular element 6, extending telescopically towards the forming station 4, passes at least partially inside the punching member 8.

In other words, the telescopically extending tubular element 6 is at least partially disposed within the second passage channel.

Preferably, in this variant, the punching member 8 is movable towards the product forming station 4 independently with respect to the telescopic movement of the tubular element 6.

In particular, the device 1 comprises means for moving the tubular element 6 and other means for moving the punching member 8.

In the various variants illustrated for "single-layer" applications with tubular element 6, the means for deforming 5 the sheet of dough comprise a pair of parallel rotating rollers 5*a*, 5*b* or cylinders (the "forming rollers") placed one above the other and defining the gap 15 for the passage of the sheet of dough 101.

The rollers 5*a*, 5*b* are configured to rotate each around its corresponding axis of longitudinal symmetry in mutually opposite directions so as to allow the advancement of the sheet of dough 101 in the gap 15.

The rollers 5*a*, 5*b* are facing each other and tangent to each other at a coupling area of two incised portions of sheet of dough 101. In the coupling area, the two portions obtained from the same sheet of dough 101 are joined around the dose of stuffing 102.

In accordance with the embodiment described herein and illustrated in FIGS. 4 to 8, the prevalent direction A-A of telescopic development of the tubular element 6 is substantially orthogonal to the axes of symmetry of the two rollers 5*a*, 5*b*. In other words, the stuffing is pushed laterally towards the deforming means 5, substantially horizontally.

Preferably, the prevalent direction A-A is substantially orthogonal to the advancement trajectory T of the sheet of dough 101.

Preferably, the dispensing means 2 also comprises a piston 9 slidably inserted into the first passage channel 7 to push the dose of stuffing 102 towards the open end 6*a* of the tubular element 6.

Alternatively, other inclinations of the prevalent direction A-A are possible with respect to the axes of symmetry of the two rollers 5*a*, 5*b* (and to the advancement trajectory of the sheet of dough 101).

Even in these different inclinations, the stuffing arrives laterally at the rollers 5*a*, 5*b*, but inclined differently and not horizontally.

FIG. 9 illustrates the application to the "single-layer" sheet with the second embodiment of the support 3, i.e. the plate-like element 13.

In this variant, the punching member 8 is separated from the dispensing means 2.

The punching member 8 is crossed by a second passage channel 19 sized in such a way that the plate-like element 13, by moving towards the forming station 4, passes at least partially through the punching member 8. Preferably, the stuffing supply circuit 14 comprises at least one stuffing passage channel 102 within which a piston 9 is slidably inserted to push a dose of stuffing 102 towards the plate-like element 13.

The plate-like element 13 is movable (continuously or discretely) between a first limit position corresponding to the maximum distance from the deforming means 5, and a second limit position corresponding to the minimum distance from the deforming means 5.

For the application with "double-layer" sheet, reference is initially made to FIGS. 11 to 15.

The following description relates to the first embodiment, in which the support 3 for the stuffing consists of the tubular element 6.

In the variants illustrated for "double-layer" applications with tubular element 6, the means for deforming 5 the sheet of dough comprises a pair of parallel rotating rollers 5a, 5b (the "forming rollers") placed alongside one another and defining the gap 15 for the passage of the sheet of dough 101.

The rollers 5a, 5b are configured to rotate each around its corresponding axis of longitudinal symmetry in mutually opposite directions so as to allow the advancement of the sheet of dough 101 in the gap 15.

The rollers 5a, 5b are facing each other and tangent at a coupling area of the two distinct layers 101a, 101b of sheet. In the coupling area, the two layers 101a, 101b are joined around the dose of stuffing 102.

The rollers 5a, 5b have a plurality of recesses 12 on their peripheral surface. These recesses 12 constitute moulds configured to shape the sheet in such a way as to allow the creation of the housing sites for the doses of stuffing 102.

Preferably, the sheet of dough 101 is supplied from above and guided towards the deforming means 5 through diverting means 11a, 11b. For example, the diverting means 11a, 11b comprise another pair of rollers that respectively guide a first layer 101a and a second layer 101b of sheet of dough 101.

In the variant illustrated in FIGS. 11 to 15, the prevalent direction A-A of telescopic development of the tubular element 6 is substantially orthogonal to the axes of symmetry of the two rollers 5a, 5b. In other words, the dose of stuffing 102 is pushed towards the deforming means 5 from above, substantially vertically.

Preferably, the dispensing means 2 also comprises here a piston 9 slidably inserted into the first passage channel 7 to push the dose of stuffing 102 towards the open end 6a of the tubular element 6.

Alternatively, other inclinations of the prevalent direction A-A with respect to the axes of symmetry of the two rollers 5a, 5b are possible.

Even in these different inclinations, the dose of stuffing 102 arrives from above at the gap 15 defined by the rollers 5a, 5b.

In the variant illustrated in FIGS. 16 to 20, an inclination of the tubular element 6 that is different from the vertical arrangement described above is shown.

Finally, even if it has not been illustrated herein, it is possible to provide for the use of the movable plate-like element 13 also for the application to the "double-layer" sheet.

Preferably, a concave or planar plate-like element 13 with sidewalls is employed, which can move according to a predefined direction D inclined with respect to the vertical, from the dispensing means 2 to the rollers 5a, 5b.

The process for forming stuffed pasta products starting from a sheet of dough, according to the present invention, is described below.

First of all, a dose of stuffing 102 must be provided on a support 3, which may be a tubular element 6 or a plate-like element 13 such as those described above.

The sheet of dough 101 may be single-layer or double-layer.

For the "single-layer" application and first embodiment, for example the variant illustrated in FIGS. 4-8 is considered, in which the punching member 8 and the tubular element 6 are made as a single piece.

The sheet of dough 101, formed by a single layer, is lowered from top to bottom.

Figure 5:
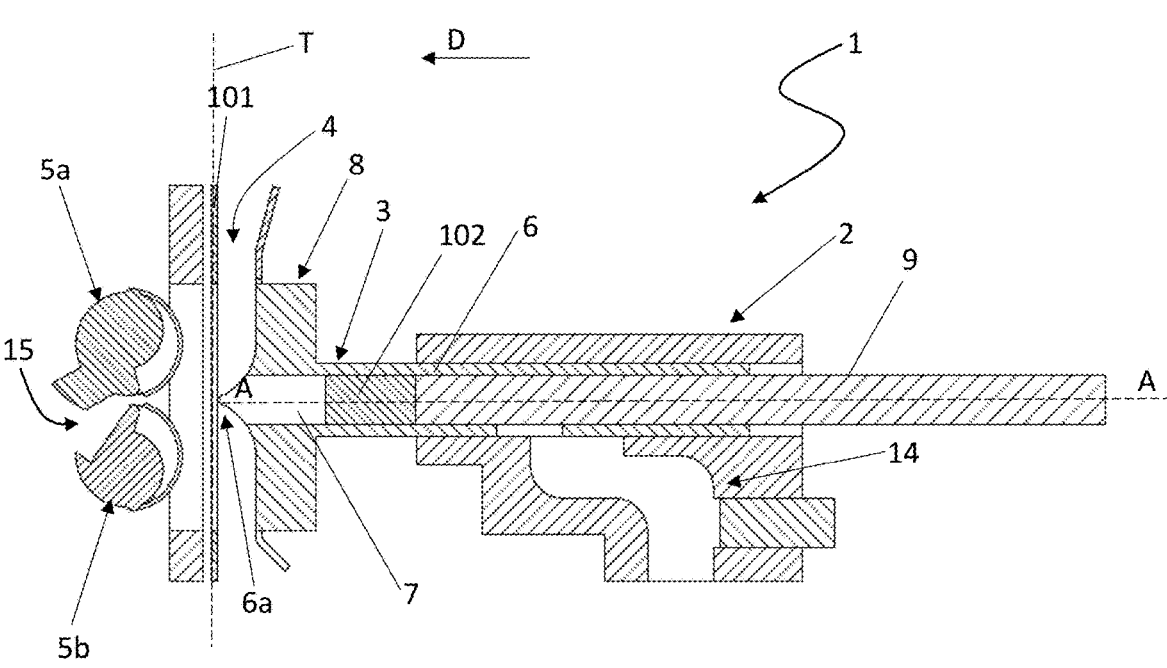

For dosing the stuffing in the forming station 4, the tubular element 6 is telescopically extended from the first limit position (maximum distance from the rollers 5a, 5) to the second limit position (minimum distance from the rollers 5a, 5b). During this extension, the punching member 8 arrives at the forming station 4 where it prepares itself to incise the single layer of sheet of dough 101 lowered from above (FIG. 5).

Figure 6:
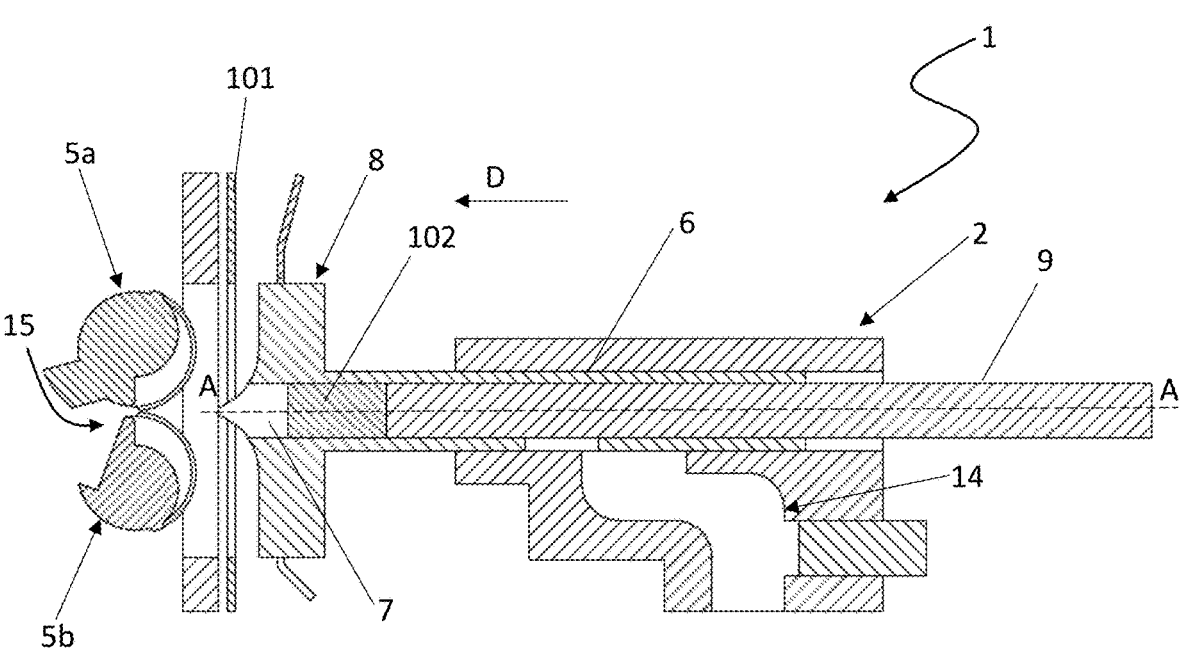
Figure 7:
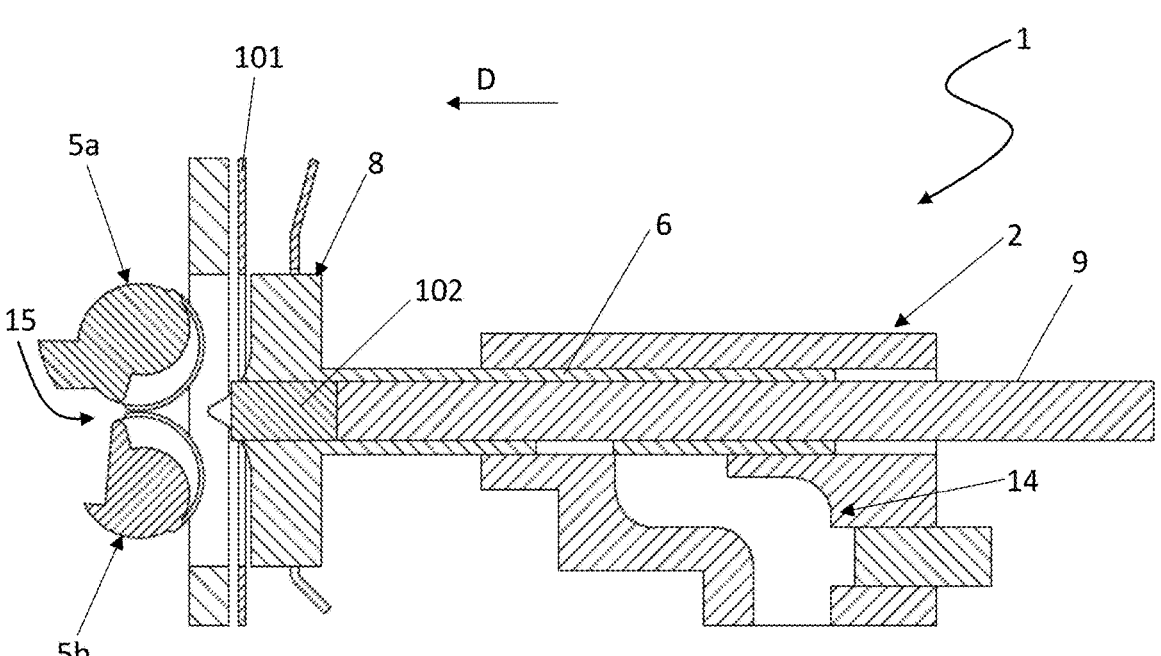
Figure 8:
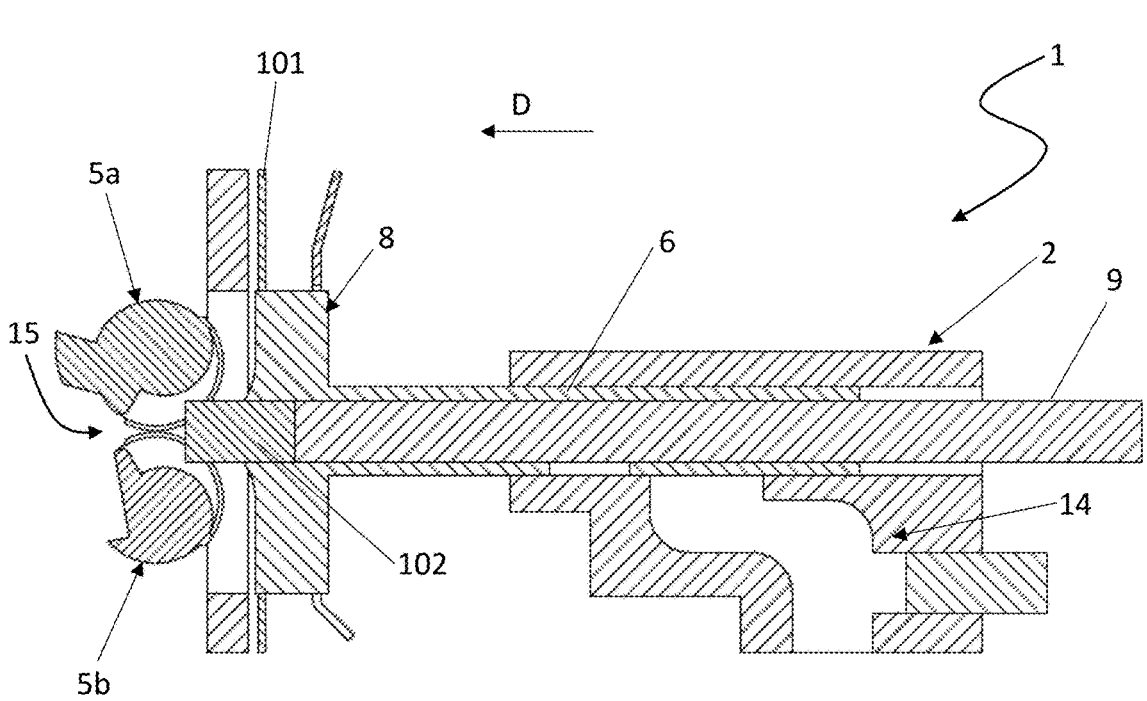

The piston 9, by sliding in the first passage channel 7, advances the dose of stuffing 102 towards the forming station 4 (FIGS. 6-7). Since the first passage channel 7 also extends within the punching member 8, the dose of stuffing 102 arrives near the gap 15 between the rollers 5a, 5b, where it is transferred (FIG. 8).

The next steps are already known to the state of the art and comprise the shaping of the sheet of dough 101 thus stuffed to create the desired product.

By accompanying the dose of stuffing 102 as far as the gap 15 thanks to the telescopicity of the tubular element 6, displacements or losses of stuffing are avoided.

For the "single-layer" application and second embodiment, refer to FIG. 9.

The sheet of dough 101, formed by a single layer, is again lowered from top to bottom.

For dosing the stuffing in the forming station 4, the plate-like element 13 is arranged in the first limit position, which corresponds to the maximum distance from the rollers 5a, 5b and to the minimum distance from the dispensing means 2.

The dose of stuffing 102 is then transferred to the plate-like element 13 by the piston 9.

The plate-like element 13 is progressively brought closer to the rollers 5a, 5b until it assumes the second limit position, which corresponds to the minimum distance from the rollers 5a, 5b and to the maximum distance from the dispensing means 2.

In this position, the dose of stuffing 102 is transferred to be wrapped inside the sheet of dough 101, which is incised by the punching member 8.

By accompanying the dose of stuffing 102 as far as the gap 15 thanks to the movement of the plate-like element 13, displacements or losses of stuffing are avoided.

For the "double-layer" application and first embodiment, for example the variant illustrated in FIGS. 16 to 20 are considered, in which the tubular element 6 is inclined with respect to the vertical.

The two layers 101a, 101b of sheet of dough 101 are guided separately towards the rollers 5a, 5b.

For dosing the stuffing in the forming station 4, the tubular element 6 is telescopically extended from the first limit position (maximum distance from the rollers 5a, 5) to the second limit position (minimum distance from the rollers 5a, 5b).

Figure 20:
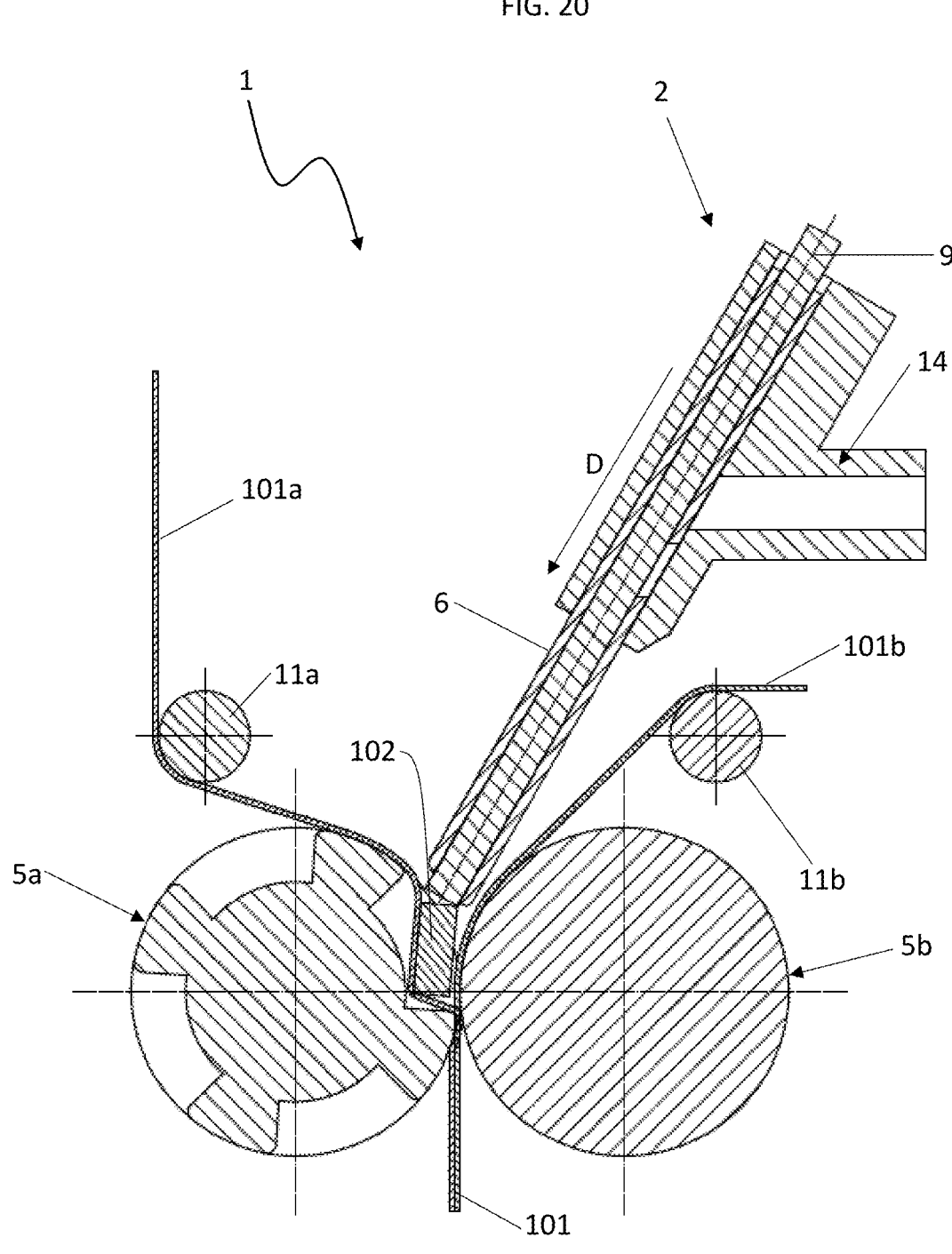

The piston 9, by sliding in the first passage channel 7, advances the dose of stuffing 102 towards the forming station 4 (FIGS. 17-19), up to near the gap 15 between the rollers 5a, 5b, where it is transferred (FIG. 20).

By accompanying the dose of stuffing 102 as far as the gap 15 thanks to the telescopicity of the tubular element 6, losses of stuffing are avoided.

In this case, at the exit from the forming rollers 5a, 5b a continuous ribbon of sheet is obtained in which the two layers 101a, 101b are welded together around the stuffings dispensed.

The separation of the various products takes place by means of another pair of rollers, called shearing rollers or cutting rollers (not illustrated).

Figure 21:
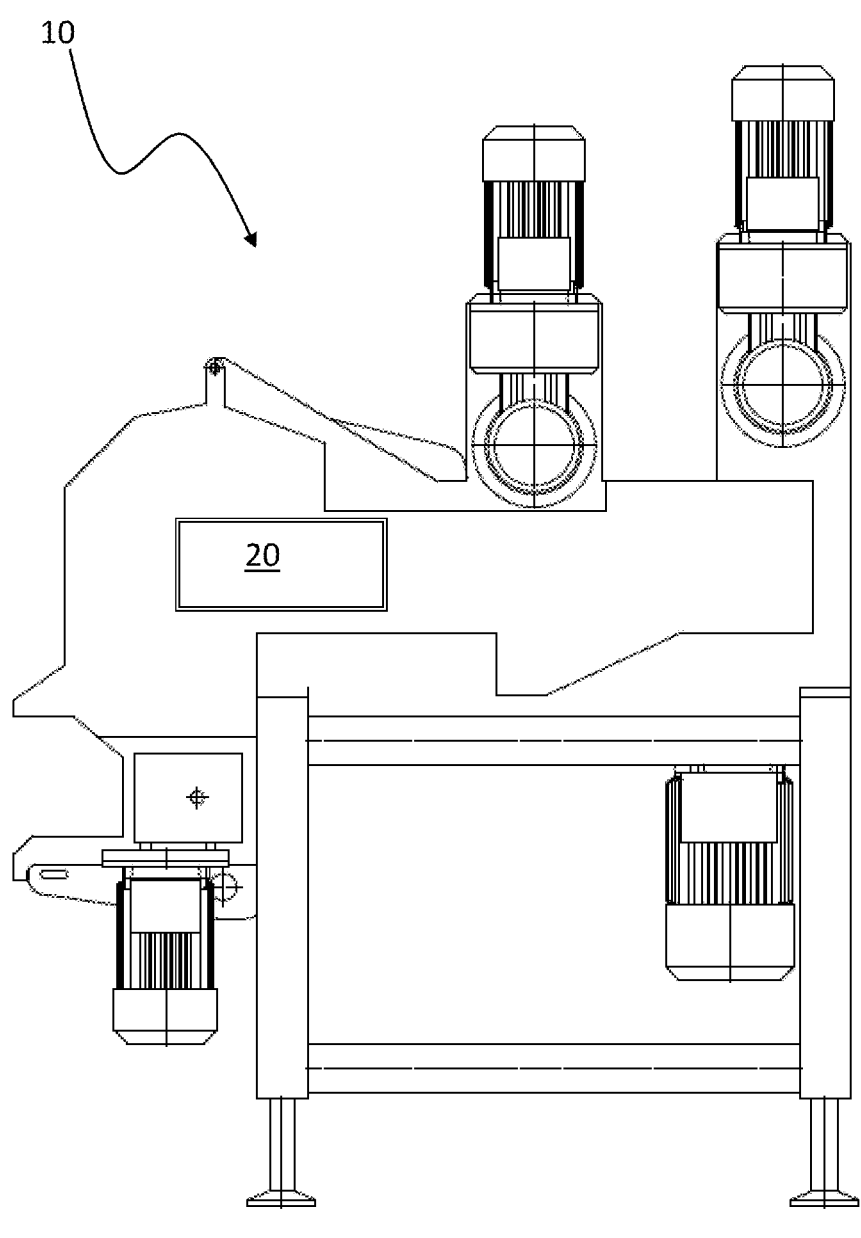
FIGS. 21 and 22 illustrate forming apparatuses, in accordance with the present invention.

FIG. 21 schematically illustrates a forming apparatus 10 comprising a plurality of devices 1 for the "single layer" applications. The devices 1 are arranged side by side in the area indicated by the number 20.

Figure 22:
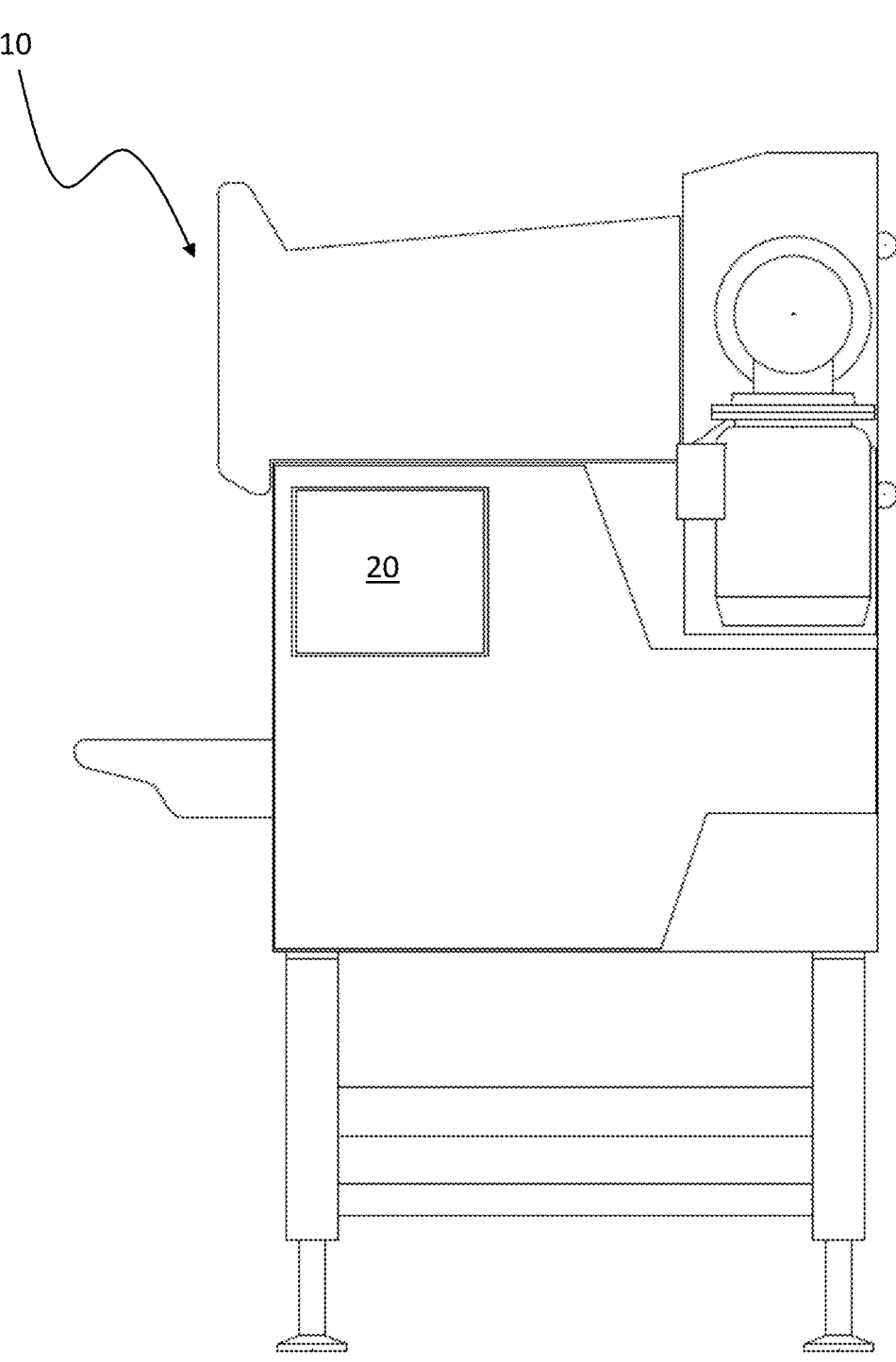

FIG. 22 schematically illustrates a forming apparatus 10, comprising a plurality of devices 1 for the "double-layer" applications. The devices 1 are arranged side by side in the area indicated by the number 20.

From the above description the characteristics of a device and a process for forming stuffed pasta products starting from a sheet of dough according to the present invention will be clear, as will the resultant advantages thereof.

In particular, thanks to the fact that the stuffing tablet is supported up to the product forming area, displacements and losses of stuffing are avoided.

In this way, the products are formed correctly, that is, with the desired dose of stuffing and in a central position with respect to the product.

In addition, dirtying the parts of the machine that are located below the forming area or the "syringe", with the risk of compromising its functionality and, in any case, requiring cleaning interventions are avoided.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the present invention.

The invention claimed is:

1. A device for forming stuffed pasta products starting from a sheet of dough, comprising:
    dispensing means for dispensing a stuffing comprising at least one support for the stuffing; and
    a forming station in which means for deforming the sheet of dough is arranged so as to create in the sheet of dough a housing site for housing a dose of stuffing coming from said support,
said support being movable along a predefined direction towards said forming station,
wherein said support comprises a tubular element extending along a prevalent direction parallel to the predefined direction and delimiting a first passage channel of the stuffing, said tubular element having an open end for dispensing the dose of stuffing and being telescopic along the prevalent direction so as to move the open end towards the forming station, said telescopic tubular element being composed by a plurality of portions that are each made to slide one with respect to the other so as to pass from an extracted configuration to a retracted configuration.

2. The device according to claim 1, further comprising a punching member configured to incise the sheet of dough.

3. The device according to claim 2, wherein said punching member is placed upstream of the means for deforming the sheet of dough.

4. The device according to claim 3, wherein said punching member is obtained by a shaping of the open end of said tubular element.

5. The device according to claim 3, wherein said punching member is integrally fixed to said tubular element at the open end thereof.

6. The device according to claim 3, wherein said punching member is interposed between said means for deforming the sheet of dough and said tubular element.

7. The device according to claim 6, wherein said tubular element is partially extensible inside the punching member.

8. The device according to claim 6, wherein said punching member is movable towards the forming station independently with respect to the telescopic movement of the tubular element.

9. The device according to claim 3, wherein said means for deforming the sheet of dough comprises a pair of parallel rotating rollers placed one above the other and defining a gap for the passage of the sheet of dough.

10. The device according to claim 1, wherein said means for deforming the sheet of dough comprises a pair of parallel rotating rollers placed alongside one another and defining a gap for the passage of a first layer and a second layer of the sheet of dough.

11. The device according to claim 10, wherein said tubular element is orthogonal or inclined with respect to corresponding axes of rotation of the rollers.

12. The device according to claim 1, wherein said support consists of a plate-like element.

13. The device according to claim 12, wherein said plate-like element has a planar extension or planar with side edges or has a concave shape.

14. A forming apparatus comprising a plurality of devices according to claim 1, said devices being arranged alongside one another.

* * * * *